Figure 1:
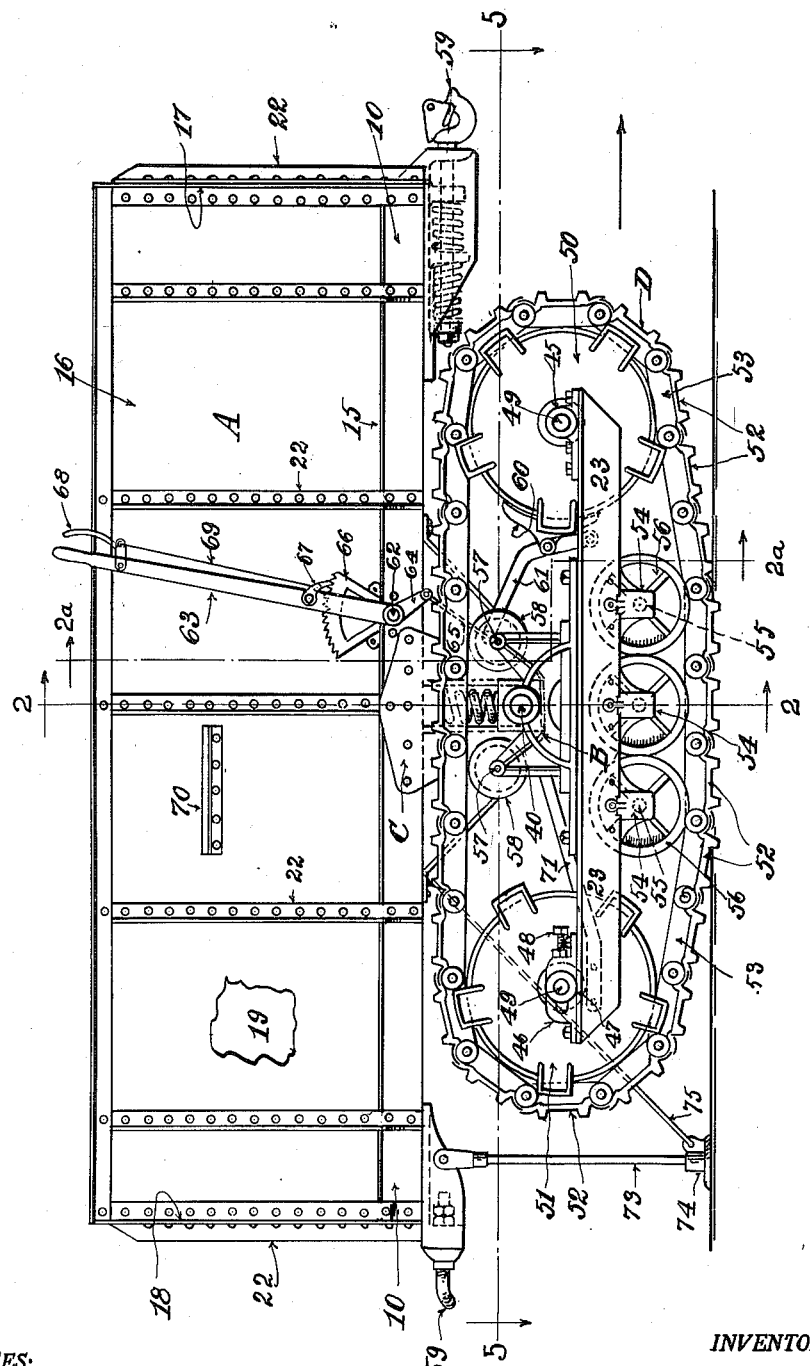

O. C. HOUGHTON.
TRAILER FOR MOTOR VEHICLES.
APPLICATION FILED OCT. 13, 1917.

1,278,931.

Patented Sept. 17, 1918.
4 SHEETS—SHEET 1.

WITNESSES:
Jee Stark.
Al. Stark.

INVENTOR:
ORLEY C. HOUGHTON,
BY
Michael J Stark & Son
ATTORNEYS.

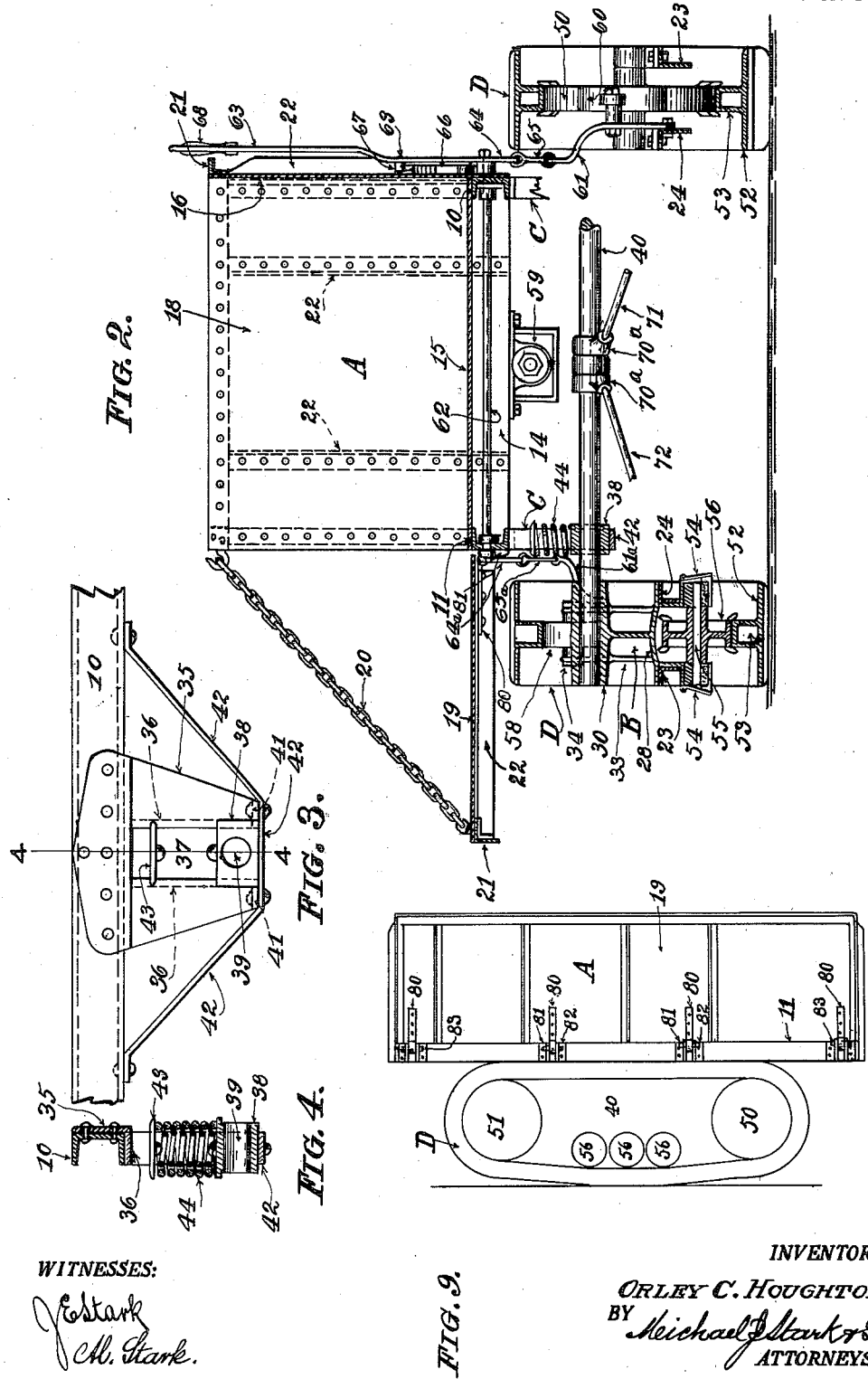

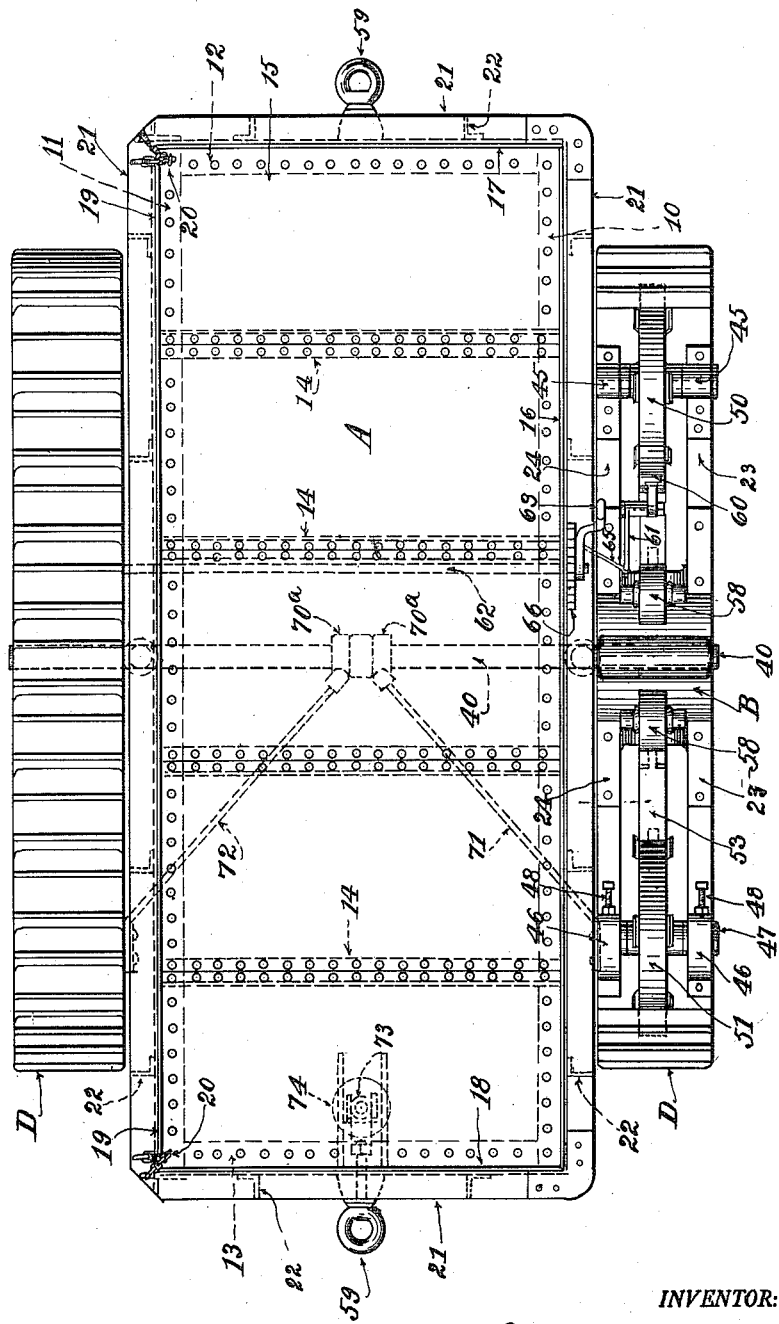

O. C. HOUGHTON.
TRAILER FOR MOTOR VEHICLES.
APPLICATION FILED OCT. 13, 1917.
1,278,931.
Patented Sept. 17, 1918.
4 SHEETS—SHEET 4.
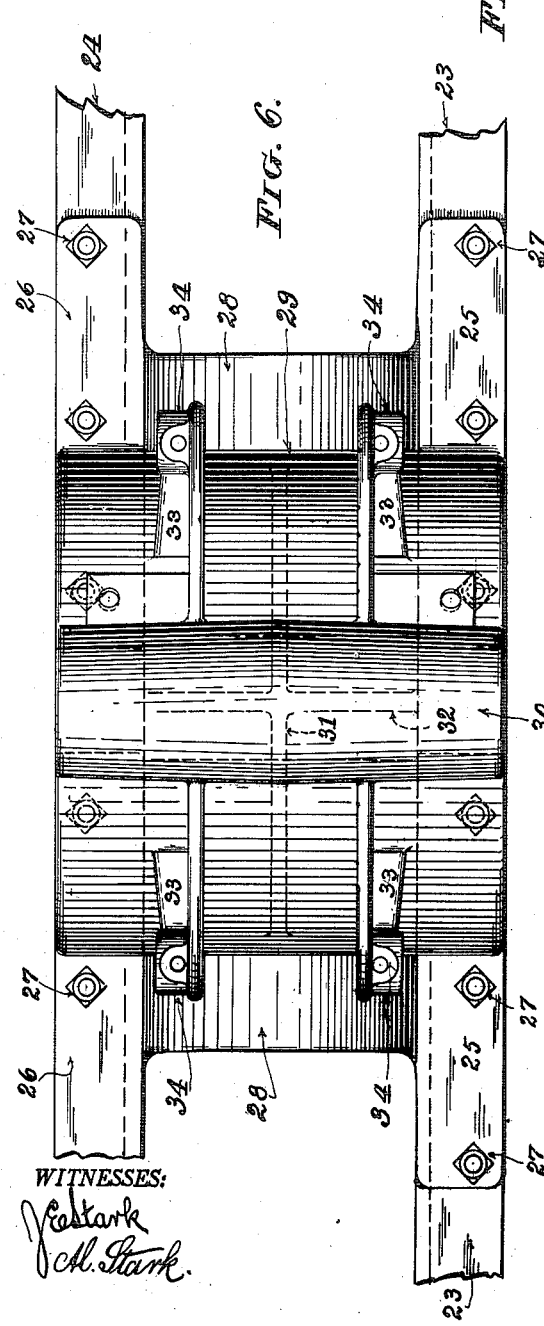
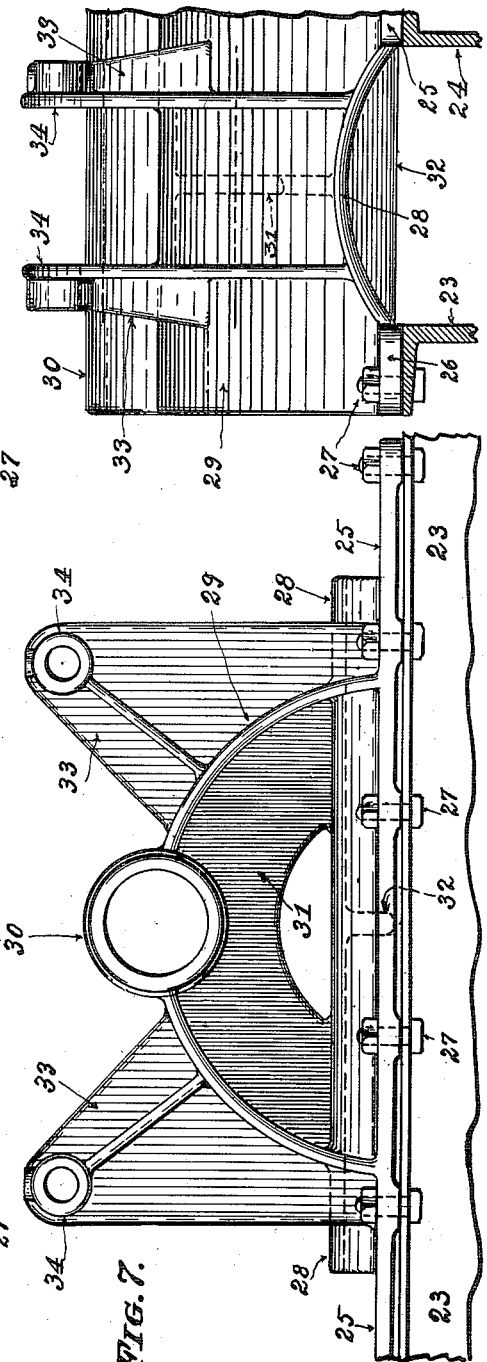
WITNESSES:
INVENTOR:
ORLEY C. HOUGHTON,
BY
ATTORNEYS.

UNITED STATES PATENT OFFICE.

ORLEY C. HOUGHTON, OF CHICAGO, ILLINOIS, ASSIGNOR TO FREDERICK C. AUSTIN, OF CHICAGO, ILLINOIS.

TRAILER FOR MOTOR-VEHICLES.

1,278,931.   Specification of Letters Patent.   Patented Sept. 17, 1918.

Application filed October 13, 1917.   Serial No. 196,407.

*To all whom it may concern:*

Be it known that I, ORLEY C. HOUGHTON, a citizen of the United States, and a resident of the city of Chicago, in the county of Cook and State of Illinois, have invented a certain new and useful Improvement in Trailers for Motor-Vehicles; and I do hereby declare that the following description of my said invention, taken in connection with the accompanying sheet of drawing, forms a full, clear, and exact specification, which will enable others skilled in the art to which it appertains to make and use the same.

My invention relates generally to improvements in trailers for motor vehicles; and it consists, essentially, in the novel and peculiar combination of parts and details of construction, as hereinafter first fully set forth and described and then pointed out in the claims.

The object of this invention is the production of an efficient, serviceable, convenient, and easily moved trailer for motor driven vehicles, and especially that class of machines on which endless track bands are employed as a means of propulsion of the vehicle.

To attain this object, I construct this trailer in the preferred embodiment of my invention, as shown in the drawings forming a part of this specification, and illustrating this vehicle very fully. In these drawings, Figure 1 is a side elevation of this trailer. Fig. 2 is a transverse sectional elevation, the right hand portion of which is drawn on the indirect line 2ª—2ª of Fig. 1, the left hand portion thereof being drawn on line 2—2 of the same Fig. 1. Fig. 3 is an elevation of one of the supports or hangers that carry the superstructure of the vehicle, the springs employed in this hanger being omitted. Fig. 4 is a transverse sectional elevation of the hanger, on line 4—4 of Fig. 3. Fig. 5 is a plan of the trailer, the right hand traction element being drawn in section on line 5—5 of Fig. 1. Fig. 6 is a plan of a portion of the truck employed in this trailer, and illustrating the connector for the two truck-members, this figure, and the next following Figs. 7 and 8 being drawn on an increased scale. Fig. 7 is a side elevation; and Fig. 8 is an end elevation of the connector. Fig. 9 is a miniature, diagrammatic, view of the trailer, showing the hinge connection of one of the sides of the wagon box to the subframe of the trailer.

This trailer comprises a wagon-box like structure which is mounted on a pair of trucks, one on each side of the box, there being mounted in each truck a pair of band wheels over which an endless track band is stretched on which the vehicle moves when drawn behind a motor driven vehicle, the trailer not being provided with means for auto-propulsion. This box is supported upon the trucks by springs; and it has one of its sides hingedly connected to the subframe, so that it may be swung, or turned down to facilitate loading and unloading of the vehicle.

The box A, includes a subframe constructed of two longitudinal channel bars 10, 11, and two end channel bars 12, 13, the longitudinal channel bars being connected by a series of transverse beams 14, all of which bars are securely connected, one to the other, in the conventional steel construction, which is so well known as not to require illustration or description. Upon this subframe there is located the bottom 15, comprising a multiplicity of steel plates securely riveted, as shown, to the subframe. To one of the side, and to the two end channel bars 10, 12, and 13, there is securely riveted one of the sides 16, and the two ends 17, 18 of the box, while the second longitudinal side 19, is hingedly connected to the longitudinal channel 11, so that this side 19 may be turned down to approximately horizontal position, as shown in Fig. 2, to facilitate loading and unloading of the vehicle, said drop side 19 being held in substantially horizontal position by chains 20, as clearly illustrated in Fig. 2. To the upper margins of all the side and end walls there are riveted angles 21; and at the sides and ends there are vertically spaced angles 22, whereby a very strong and substantial structure is attained, which, being entirely constructed of commercial structural steel shapes, can be produced at a reasonable price.

The box A is supported upon two trucks, which are alike in construction, and will, therefore, be described in the singular number. Each truck includes two angle bars 23, 24, having, preferably, unequal limbs, the longer ones being vertically disposed to insure greater strength. These two angles are, medially of their length, connected by a casting B, Figs. 1, 2 and 5, and in detail, and on an increased scale in Figs. 6, 7, and 8. This casting comprises two bars 25, 26, by which, and bolts 27, this casting, which I term connector, is securely bolted to the angles 23, 24. These two bars 25, 26, are rigidly connected by a longitudinal arcuate member 28; and upon these bars and the arcuate member 28, rises a transverse arch 29, reaching entirely across the truck, and having in its crown a transverse bearing 30; there being a web 31, in said arch to stiffen the same, while a web 32, in the arcuate member 28 performs a like function.

From the arch 29 rise four supports 33, which terminate in bearings 34, the object of which bearings will hereinafter appear.

To the underside of the longitudinal channels 10, 11, of the subframe, there are secured hangers C, Figs. 1 and 2, and shown in detail on an increased scale in Figs. 3 and 4. Each of these hangers comprises an, approximately inverted U-shaped, plate 35, said plate having ribs 36, of a width approximately equal to the horizontal limbs of the truck channels 10, 11, which ribs are in parallel spaced relationship, to afford an opening 37, therebetween; and in this opening there is movably mounted a journal box 38, bored as at 39, to receive an axle 40, which axle reaches transversely from the outer side of one of the trucks to the outer side of the other truck, and engages the bearings 30 of the connectors B, whereby said trucks may oscillate on said axle 40 to follow undulations of the ground over which the trailer may be moving. The hangers have at the lower terminals flanges 41, to which are riveted brace bars 42, the members of which extend divergingly from the hangers and have their ends secured to the undersides of the channels 10, 11. These braces prevent the journal boxes 38 from dropping out of the hangers, and at the same time serve as stiffeners for the same. Traversing the opening 37 in the hanger, there is a plate 43; and between this plate and the top of the journal box there are interposed in the opening 32, preferably two, springs 44, whereby the vehicle box is flexibly supported on the trucks.

At the forward ends of the truck-members 23, 24, there are secured journals 45; and at the opposite ends of said truck-members there are bolted housings 46, in which there are movably mounted similar journal boxes 47, which latter journal boxes may be moved in their housings by adjusting screws 48, the object of which is to afford means by which slack in the endless track band may be taken up.

In the journal boxes 45 and 47 there are mounted shafts 49; and upon these shafts are mounted band wheels 50, 51. Over these band wheels there are trained endless track bands D, which bands are composed of pivotally connected links 52, having a track 53, on which the vehicle travels, each link having a wide shoe or tread to afford large bearing surfaces for the vehicle.

From the lower margins of the truck angles 23, 24, extend axle boxes 54, Figs. 1 and 2, in which are rotatably mounted shafts 55 on which are secured track wheels 56, which travel upon the tracks 53; and I may now mention that the bearings 34 of the connector B receive shafts 57, Fig. 1, on which there are secured carrying rollers 58, that support the upper stretch of the endless track band D. Regarding these axle boxes I will remark that they are of the usual car axle box construction as employed on every railway or street car, and that in their present employment they perform their functions precisely in the same manner without change or modification, their employment in a motor driven vehicle being considered by me but a case of double use.

This trailer has at its ends couplings 59, whereby it may be connected to a motor driven vehicle, and whereby other trailers may be connected to the first trailer whenever a train of cars is being made up.

In view of the fact that the speed of the trailer cannot be well controlled when moving on a down grade and be liable to bump into the tractor, I provide means for avoiding this trouble; said means including brake mechanism comprising the following elements:

On the periphery of each of the band wheels 50, (or on the band-wheels 51 for that matter) there is located a brake shoe 60; and to the inner side of the truck angle bar 24 there is pivoted a brake lever 61, pivotally connected to the brake shoe. To the longitudinal channels of the subframe are secured bearings in which there is mounted a shaft 62, to one end of which there is affixed a hand-lever 63, one member 64 of which connects to the brake-lever 61 by a rod 65. Behind the hand-lever 63 there is placed a ratchet segment 66, wherewith engages a pawl 67, Fig. 1, which pawl is actuated by a release-lever 68, pivoted to the hand-lever 63, and connected to the dog or pawl 67 by a rod 69. Pulling this hand-lever toward the left of Fig. 1, will apply the brake shoe to the band wheel, and the pawl 67 will hold the shoe in applied position, while manipulating the release-lever 68 to disengage the pawl, and moving the hand-lever back to original or normal position, will release the brake. As hereinbefore stated, the brake-shaft 62 crosses the subframe, and at the end of the shaft which is opposed to the hand-lever, there is mounted an arm 64$^a$, which by a rod 65$^a$ connects to a brake-lever 61$^a$, and the latter to a brake shoe (not shown) bearing on the second band wheel 50, so that both brakes are applied and released by the single hand-lever 63. And to afford a suitable place for a brakes man to operate the brake-lever, I place on the box A a seat 70, convenient to the brake-lever, on which the brakes man may be seated.

In order to preserve the parallelism of the two trucks, there are mounted on the axle 40, and medially thereof, collars 70ª; and from these collars diverge tie rods 71, 72, which reach rearwardly to the rear ends of the inner truck members 24, and are securely fastened thereto, as indicated in Figs. 1 and 5.

To support the vehicle box A in approximately horizontal position, when the trailer is not coupled to a motor driven vehicle, I provide at one end of the box A a pivoted supporting bar 73, having at its lower end a shoe 74, there being a slight preponderance of weight at this end of the wagon box by locating the supporting axle 40 slightly out of the center of the box. To this supporting bar is connected a wire rope or other suitable means 75, by which the supporting bar may be pulled up when not required, in an obvious manner.

I will now state that the entire structure described, is metallic, no wood or other material entering into the construction thereof, which, therefore, produces a most substantial structure; and while this trailer is well adapted for hauling heavy merchandise and materials, it is especially well adapted for military and war purposes for supplying an army with ammunition, food, and other requisites in large quantities, and particularly so when a train of these trailers is pulled by a traction engine having sufficient draw-bar pull for this purpose.

The trailer is constructed to move upon a self-laying track having very wide shoes or treads, and a long wheel base whereby it is admirably well adapted for operation in the field, upon soft, muddy, or boggy soil where a trailer having wheels would be positively mired and useless.

In this connection I desire to call attention to the fact that while this trailer has trucks, primarily designed for use on vehicles not supplied with motive power, these trucks are equally well adapted for employment in motor driven vehicles, one of the novel features in these trucks being the employment of structural steel for the horizontal members of the truck frames, and in the connector for these members, which is an integrally formed casting of the particular construction hereinbefore described. I have also stated that one of the side walls of the wagon box is hingedly connected to one of the longitudinal channel bars of the subframe; and in Fig. 9 I have illustrated this hinge construction. To the wall 19 where are securely fastened hinge-members 80; and to the channel bar 11 there are secured hinge-members 81, 82, in which, and the hinge-members 80 there are pins 83, on which the side wall may swing. Locking means, not shown, may be provided to hold the drop side to the box in vertical position.

I have hereinbefore described with considerable minuteness the preferred embodiment of my invention, but I desire it to be distinctly understood that I am aware that minor details of construction disclosed, may be changed, and parts omitted without departing from the scope of my invention as defined in the subjoined claims.

Having thus fully described this invention, I claim as new, and desire to secure to myself by Letters Patent of the United States—

1. A trailer for motor driven vehicles, including, a subframe, a wagon box on said subframe, and a running gear for said trailer, comprising, a truck on each side of said subframe, each truck including a pair of spaced-apart angle bars, a connector on said angle bars, a bearing at the apex of said connector, an axle mounted in said bearing, hangers depending from said subframe and engaging said axle, a pair of band wheels rotatably mounted between said spaced-apart angle bars, an endless track band trained over each coacting pair of band wheels, car-axle boxes depending from said spaced-apart angle bars, a series of track wheels rotatably mounted in said car-axle boxes and engaging said endless track band, there being on said connector upwardly extending supports, said supports terminating in bearings, and rollers rotatably mounted in the latter bearings and supporting the upper run of said endless track band.

2. In a trailer for motor driven vehicles, the combination, of a subframe, a wagon box on said subframe, a running gear for said trailer, said running gear including two trucks, one on each side of said subframe, each truck including two spaced-apart angle bars, a connector, said connector consisting of two bars to which said angle bars are secured, a longitudinal, arcuate, member connecting said two bars, a transverse arch sprung from the outer edge of one of said bars to the outer edge of the other of said bars, a bearing in the crown of said arch, an axle mounted in said bearing, and means connecting said axle to said sub-frame.

3. In a trailer constructed for connection to a motor vehicle, the combination, with a wagon body, of two trucks for supporting said wagon body, one on each side thereof, each truck comprising a pair of angle bars in parallel spaced relationship, a connector for said angle bars, said connector being a casting having integrally formed therewith two arched members crossing each other, one of said arched members having a main bearing and upwardly extending supports, each support terminating in a bearing, band wheels rotatably mounted between said spaced-apart angle bars, an endless track band trained over said band wheels, supporting rollers mounted in the bearings of the upwardly extending supports, an axle mounted in said main bearing, and means connecting said axle to said wagon body.

4. In a trailer, the combination, of a subframe, said subframe including two channel bars in spaced relationship, a wagon box mounted on said subframe, a pair of trucks for said subframe, an axle connecting said trucks, and means on said subframe to connect said subframe to said axle, said means including inverted, U-shaped, plates, the top members of said plates being bolted to the sides of said channel bars, each plate having rearwardly extending ribs, said ribs being in parallel spaced relationship to afford between them a vertical opening, a cross bar in said opening, a journal box vertically movable in said opening, springs in said opening between said journal box and said cross bar, said axle engaging said journal box.

5. In a trailer, the combination, of a subframe, a wagon box on said subframe, a pair of trucks for said subframe, an axle connecting said trucks, and means on said subframe for connecting said subframe to said axle, said means including an inverted U-shaped plate, said plate having rearwardly extending ribs, said ribs being in parallel spaced relationship to afford between them a vertical opening, a cross bar in said opening, a journal box vertically movable in said opening, springs in said opening between said journal box and said cross bar, said plate being fixedly connected to said subframe, and brace rods connecting the lower terminals of said U-shaped plate to said subframe at a distance from said plate.

6. In a structure of the nature described, a truck frame, said truck frame including two angle bars, said angle bars having unequal legs, said angle bars being in parallel spaced relation, said angle bars being rigidly connected to each other, said connection being an integrally-formed casting, said casting comprising two bars to which said angle bars are fastened, an arcuate member connecting these two bars at the inner margins thereof, an arch sprung from the outer margin of one bar to the outer margin of the other bar, a bearing at the crown of the latter arch, a multiplicity of supports rising from the latter arch, each of said supports terminating in a bearing.

7. In a structure of the nature described, a truck frame, said truck frame including two angle bars, said angle bars having unequal legs, said angle bars being in parallel spaced relation, said angle bars being rigidly connected to each other, said connection being an integrally-formed casting, said casting comprising two bars to which said angle bars are fastened, an arcuate member connecting these two bars, an arch sprung from the outer margin of one bar to the outer margin of the other bar, a bearing at the crown of the latter arch, a multiplicity of supports rising from the latter arch, each of said supports terminating in a bearing, car axle boxes secured to, and depending from, the lower margins of said angle bars.

8. In a structure of the nature described, a truck frame, said truck frame including two angle bars in parallel spaced relationship, said angle bars being rigidly connected to each other, said connection being an integrally formed casting, said casting comprising two bars to which said angle bars are fastened, an arcuate member connecting said two bars, a second arcuate member crossing said first arcuate member at right angles, a main bearing at the crown of the latter arcuate member, a multiplicity of supports rising from said latter arcuate member, each of said supports terminating in a bearing, an axle engaging said main bearing, a wagon box supported by said axle, a fixed bearing at one end of each angle bar, a housing at the other ends of said angle bars, movable journal boxes in said housings, shafts mounted in the boxes on the angle bars, band wheels mounted on said shafts, an endless track band trained over said band wheels, shafts rotatably mounted in the bearings on said supports, supporting rollers mounted on the latter shafts to support the upper stretch of said endless track band, car axle boxes depending from said angle bars, shafts rotatably mounted in said car axle boxes, and track wheels on the latter shafts to run on the lower stretch of said endless track band.

In testimony that I claim the foregoing as my invention, I have hereunto set my hand.

ORLEY C. HOUGHTON.